United States Patent
Takahashi et al.

(10) Patent No.: US 10,731,043 B2
(45) Date of Patent: Aug. 4, 2020

(54) AQUEOUS INK JET INK COMPOSITION AND INK JET RECORDING APPARATUS

(71) Applicant: Seiko Epson Corporation, Tokyo (JP)

(72) Inventors: Takuya Takahashi, Suwa (JP); Kunihiro Fujita, Shiojiri (JP); Yusuke Mizutaki, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/950,540

(22) Filed: Apr. 11, 2018

(65) Prior Publication Data

US 2018/0298214 A1    Oct. 18, 2018

(30) Foreign Application Priority Data

Apr. 12, 2017 (JP) .................................. 2017-078823

(51) Int. Cl.
*C09D 11/38* (2014.01)
*C09D 11/033* (2014.01)
(Continued)

(52) U.S. Cl.
CPC ............. *C09D 11/033* (2013.01); *B41J 2/155* (2013.01); *C09D 11/324* (2013.01); *C09D 11/38* (2013.01); *B41J 2/14201* (2013.01)

(58) Field of Classification Search
CPC ..... C09D 11/033; C09D 11/324; C09D 11/36; C09D 11/40; C09D 11/30; C09D 11/38;
(Continued)

(56) References Cited

U.S. PATENT DOCUMENTS

| 5,851,274 A * | 12/1998 | Lin ........................ C09D 11/38 |
| | | 106/31.43 |
| 5,969,003 A * | 10/1999 | Foucher ................. C09D 11/30 |
| | | 106/31.27 |

(Continued)

FOREIGN PATENT DOCUMENTS

| EP | 1010736 A1 * | 6/2000 | ........... C09D 11/322 |
| JP | H03-006270 A | 1/1991 | |

(Continued)

OTHER PUBLICATIONS

The Engineering Toolbox Viscosity Conversion Chart, https://www.engineeringtoolbox.com/viscosity-converter-d_413.html downloaded Sep. 26, 2018 (Year: 2018).*

(Continued)

*Primary Examiner* — Manish S Shah
(74) *Attorney, Agent, or Firm* — Harness, Dickey & Pierce, P.L.C.

(57) ABSTRACT

An aqueous ink jet ink composition contains a pigment, propylene glycol, and water, in which the aqueous ink jet ink composition has the viscosity of 3.0 mm²/s or more and 10.0 mm²/s or less at 20° C., the aqueous ink jet ink composition has the pH of 7 or more, the content of the pigment is 5.5% by mass or more and 9% by mass or less based on the total amount of the aqueous ink jet ink composition, and the content of the propylene glycol is 8 parts by mass or more and 100 parts by mass or less based on 100 parts by mass of the pigment.

14 Claims, 1 Drawing Sheet

(51) Int. Cl.
*C09D 11/324* (2014.01)
*B41J 2/155* (2006.01)
*B41J 2/14* (2006.01)

(58) Field of Classification Search
CPC ..... C09D 11/32; C09D 11/322; C09D 11/328; C09D 11/101; C09D 11/102; C09D 11/005; C09D 11/54; C09D 11/52; B41J 2/155; B41J 2/14201; B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/045; B41M 5/0011; B41M 5/0017; B41M 5/0047; B41M 7/00; B41M 7/0072; B41M 5/52; B41M 5/5218
See application file for complete search history.

(56) References Cited

U.S. PATENT DOCUMENTS

| | | | |
|---|---|---|---|
| 6,294,592 B1 * | 9/2001 | Herrmann | B41M 5/0023 106/31.6 |
| 6,488,753 B1 | 12/2002 | Ito et al. | |
| 6,666,914 B2 * | 12/2003 | Hayashi | C09C 1/027 106/31.6 |
| 2001/0020431 A1 * | 9/2001 | Osumi | B41J 2/01 106/31.6 |
| 2002/0054187 A1 * | 5/2002 | Kato | B41J 2/2107 347/43 |
| 2004/0082686 A1 | 4/2004 | Takahashi et al. | |
| 2007/0037901 A1 | 2/2007 | Kanaya et al. | |
| 2009/0291215 A1 | 11/2009 | Makuta et al. | |
| 2010/0033522 A1 | 2/2010 | Saito et al. | |
| 2011/0234689 A1 * | 9/2011 | Saito | B41M 5/0017 347/21 |
| 2013/0216794 A1 * | 8/2013 | Takeda | C09D 11/30 428/195.1 |
| 2013/0295501 A1 * | 11/2013 | Zhang | C08G 63/91 430/108.22 |
| 2018/0187031 A1 | 7/2018 | Teramoto et al. | |
| 2018/0265722 A1 * | 9/2018 | Teramoto | C09D 11/322 |

FOREIGN PATENT DOCUMENTS

| | | |
|---|---|---|
| JP | 2001-164158 A | 6/2001 |
| JP | 2007-051176 A | 3/2007 |

OTHER PUBLICATIONS

U.S. Appl. No. 15/891,773, filed Feb. 8, 2018, Ryosuke Teramoto.

* cited by examiner

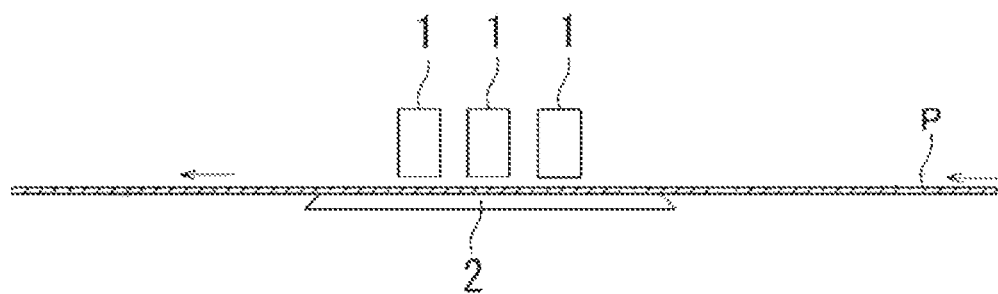

AQUEOUS INK JET INK COMPOSITION AND INK JET RECORDING APPARATUS

BACKGROUND

1. Technical Field

The present invention relates to an aqueous ink jet ink composition and an ink jet recording apparatus.

2. Related Art

An ink jet recording method enables recording of a high definition image with a relatively simple apparatus and has rapidly developed in various fields. In the development, various examinations have been made for improving the pigment concentration in order to secure color development properties in an ink jet ink containing a pigment as a coloring material. For example, JP-A-2001-164158 discloses an aqueous ink composition that contains resin fine particles containing a colorant, pigment fine particles, and polyhydric alcohol and further contains an imidazolidinone compound or propylene urea, for the purpose of providing an aqueous ink composition suitable for ink jet recording which gives an image a high image density and excellent scratch resistance, water resistance, and marker resistance, which has excellent intermittent discharge stability from a recording head when used for ink jet recording, and which is further capable of suppressing the occurrence of printing misdirection and discharge defects due to the adhesion of an ink thickened substance to the discharge port surface in an ink jet head.

In general, when the pigment concentration is increased in order to improve the color development properties, there arises a problem that sufficient intermittent printability is not obtained. In order to overcome a reduction in the intermittent printability, frequent flushing is needed. However, the frequent flushing has posed problems of a reduction in the print speed corresponding to the flushing or an increase in the ink consumption amount corresponding to the amount consumed by the flushing. Such problems become remarkable particularly in the case of using a line head which cannot be subjected to flushing at arbitrary timing.

SUMMARY

An advantage of some aspects of the invention is to provide an aqueous ink jet ink composition capable of achieving both color development properties and sufficient intermittent printability.

The present inventors have conducted an extensive examination in order to solve the above-described problems. As a result, the present inventors have found that the above-described problems can be solved by the use of a predetermined amount of propylene glycol based on a pigment, and thus has accomplished the invention.

More specifically, an aqueous ink jet ink composition according to an aspect of the invention contains a pigment, propylene glycol, and water, in which the aqueous ink jet ink composition has the viscosity of 3.0 mm$^2$/s or more and 10.0 mm$^2$/s or less at 20° C., the aqueous ink jet ink composition has the pH of 7 or more, the content of the pigment is 5.5% by mass or more and 9% by mass or less based on the total amount of the aqueous ink jet ink composition, and the content of the propylene glycol is 8 parts by mass or more and 100 parts by mass or less based on 100 parts by mass of the pigment. It is preferable in the invention that the specific surface area of the pigment measured by pulsed NMR is 20 m$^2$/g or more and 55 m$^2$/g or less, the pigment is carbon black, and the pigment is a self-dispersible pigment. Moreover, an ink jet recording apparatus according to another aspect of the invention has a line head discharging the above-described aqueous ink jet ink composition.

BRIEF DESCRIPTION OF THE DRAWING

The invention will be described with reference to the accompanying drawing, wherein like numbers reference like elements.

FIGURE is a schematic view illustrating an ink jet recording apparatus of this embodiment.

DESCRIPTION OF EXEMPLARY EMBODIMENTS

Hereinafter, an embodiment of the invention (hereinafter referred to as "this embodiment") is described in detail with reference to the drawing as necessary, but the invention is not limited thereto and can be variously modified without deviating from the scope. In the drawing, the same components are designated by the same reference numerals and the overlapping description is omitted. The positional relationship, such as left, right, top, and bottom, shall be based on the positional relationship illustrated in the drawing unless otherwise particularly specified. Furthermore, the dimension ratio of the drawing is not limited to the ratio in the drawing.

Aqueous Ink Jet Ink Composition an aqueous ink jet ink composition according to an aspect of the invention contains a pigment, propylene glycol, and water, in which the aqueous ink jet ink composition has the viscosity of 3.0 mm$^2$/s or more and 10.0 mm$^2$/s or less at 20° C., the aqueous ink jet ink composition has the pH of 7 or more, the content of the pigment is 5.5% by mass or more and 9% by mass or less based on the total amount of the aqueous ink jet ink composition, and the content of the propylene glycol is 8 parts by mass or more and 100 parts by mass or less based on 100 parts by mass of the pigment.

In general, discharge defects are more likely to occur as an increase in the amount of pigments present in a dispersion state in an ink composition. In particular, when the balance of the composition of the ink composition near a nozzle is lost due to the evaporation of a solvent from a nozzle, the discharge defects are likely to be promoted, which results in impairment of the intermittent printability. Various techniques of dispersing pigments are known. However, when an attempt of improving the color development properties by increasing the content of the pigment has been made, it has not been able to be said that the pigment is sufficiently dispersed. An improvement of the pigment dispersibility and thus of an improvement of the intermittent printability by propylene glycol is considered to be caused by, although not particularly limited to, the following mechanism. That is, the propylene glycol having a propyl chain portion (hydrophobic portion) and two hydroxyl group portions (hydrophilic portions) in a relatively small molecular weight works in such a manner as to contribute to an improvement of compatibility (stability) between an aqueous solvent and the pigment to act as a dispersion assistant in a sense. Moreover, according to the examination of the present inventors, it has been found that there is a fixed range in the use amount of the propylene glycol capable of improving the intermittent printability. Then, in this embodiment, the pigment dispersibility is improved by the use of a predetermined amount of propylene glycol based on the content of the pigment.

Pigment

The pigment is not particularly limited and the following substances are mentioned, for example. The pigments may be used alone or in combination of two or more thereof. Among the following substances, carbon black is preferably used.

Examples of the carbon black for use in a black ink include, but are not particularly limited to, No. 2300, No. 900, MCF88, No. 33, No. 40, No. 45, No. 52, MA7, MA8, MA100, No. 2200B, and the like (all manufactured by Mitsubishi Chemical Corporation), Raven 5750, Raven 5250, Raven 5000, Raven 3500, Raven 1255, Raven 700, and the like (all manufactured by Carbon Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (manufactured by CABOT JAPAN K.K.), Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, and Special Black 4 (all manufactured by Degussa).

Examples of pigments for use in a white ink include, but are not particularly limited to, C.I. Pigment white 6, 18, and 21, titanium oxide, zinc oxide, zinc sulfide, antimony oxide, zirconium oxide, and white hollow resin particles and polymer particles, for example.

Examples of pigments for use in a yellow ink include, but are not particularly limited to, C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180, for example.

Examples of pigments for use in a magenta ink include, but are not particularly limited to, C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:2, 48:5, 57:1, 88, 112, 114, 122, 123, 144, 146, 149, 150, 166, 168, 170, 171, 175, 176, 177, 178, 179, 184, 185, 187, 202, 209, 219, 224, and 245 or C.I. Pigment Violet 19, 23, 32, 33, 36, 38, 43, and 50, for example.

Examples of pigments for use in a cyan ink include, but are not particularly limited to, C.I. Pigment Blue 1, 2, 3, 15, 15:1, 15:2, 15:3, 15:34, 15:4, 16, 18, 22, 25, 60, 65, and 66, and C.I. Vat Blue 4 and 60, for example.

Examples of pigments other than the pigments mentioned above include, but are not particularly limited to, C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63, for example.

The pigments mentioned above may be dispersible pigments. Examples of methods for dispersing pigments include, for example, a method including dispersing pigments using a water-soluble resin (resin dispersion type), a method including dispersing pigments using surfactants (surfactant dispersion type), a method including chemically/physically introducing hydrophilic functional groups into the pigment particle surface for rendering the pigments dispersible and/or soluble (self-dispersion type), and the like. For the pigments to be used in this embodiment, any method mentioned above is usable and the methods can be used in combination as necessary. Among the above, the self-dispersible pigment is preferably used and a self-dispersible carbon black is more preferably used. By the use of such a pigment, it is preferable to reduce hydrophilic groups from the viewpoint of improving the color development properties since the self-dispersible pigment, particularly the self-dispersible carbon black, aggregates on a target recording medium. However, when hydrophilic groups are reduced, the intermittent printability tends to relatively decrease, and therefore a method using propylene glycol of this embodiment is more suitable.

The specific surface area of the pigment measured by pulsed NMR is preferably 20 $m^2/g$ or more and 55 $m^2/g$ or less, more preferably 22 $m^2/g$ or more and 45 $m^2/g$ or less, and still more preferably 24 $m^2/g$ or more and 35 $m^2/g$ or less. When the specific surface area of the pigment measured by the pulsed NMR is 20 $m^2/g$ or more, there is a tendency that it can be suppressed that pigment particles become excessively bulky by aggregation or the like, the dispersion stability decreases, and, consequently, the intermittent printability decreases. Moreover, when the specific surface area of pigment measured by the pulsed NMR is 55 $m^2/g$ or less, there is a tendency that the pigment particles have a certain size, and thus a reduction in the color development properties due to the entrance of the pigment particles into paper fibers can be suppressed. The specific surface area of the pigment measured by the pulsed NMR can be measured by a method described in Examples. The specific surface area of the pigment measured by the pulsed NMR relates to the pigment particle amount. A large specific surface area indicates that the pigment particle amount is large. A small specific surface area indicates that the pigment particle amount is small. That the specific surface areas varies when the pigment amounts are set to the same amount can be construed to indicate that, when the specific surface area is large, the number of the pigment particles is large and one pigment particle diameter is large and, when the specific surface area is small, the number of the pigment particles is small and one pigment particle diameter is small. The specific surface area of the pigment measured by the pulsed NMR can be adjusted by the pigment particle diameter and the dispersion method.

The content of the pigment is 5.5% by mass or more and 9% by mass or less, and preferably 5.5% by mass or more and 8% by mass or less, based on the total amount of the aqueous ink jet ink composition. When the content of the pigment is 5.5% by mass or more, there is a tendency that the coloring of the recorded matter to be obtained is further improved. When the content of the pigment is 9% by mass or less, there is a tendency that the intermittent printability is further improved.

Propylene Glycol

In the aqueous ink jet ink composition of this embodiment, even when the content of the pigment is large, the intermittent printability can be secured by the use of a predetermined amount of propylene glycol based on the pigment, and thus both the color development properties and the intermittent printability can be achieved. The reason therefor is presumed to be that the predetermined amount of propylene glycol acts like a dispersion assistant on the pigment, although not particularly limited thereto.

The content of the propylene glycol is 8 parts by mass or more and 100 parts by mass or less, preferably 10 parts by mass or more and 34 parts by mass or less, and more preferably 12 parts by mass or more and 25 parts by mass or less based on 100 parts by mass of the pigment. When the content of the propylene glycol is 8 parts by mass or more, the intermittent printability is further improved. When the content of the propylene glycol is 100 parts by mass or less, the coloring of the recorded matter to be obtained is further improved.

The content of the propylene glycol is preferably 0.5% by mass or more and 9% by mass or less, more preferably 0.6% by mass or more and 8% by mass or less, and still more preferably 0.7% by mass or more and 7% by mass or less based on the total amount of the aqueous ink jet ink composition. When the content of the propylene glycol is 0.5% by mass or more, there is a tendency that the intermittent printability is further improved. When the content of the propylene glycol is 9% by mass or less, there is a tendency that the coloring of the recorded matter to be obtained is further improved.

Water

Examples of water include water from which ionic impurities are removed as much as possible, such as pure water, e.g., ion exchanged water, ultrafiltration water, reverse osmosis water, and distilled water, and ultrapure water, for example.

The content of water is preferably 45 to 85% by mass, more preferably 50 to 80% by mass, and still more preferably 55 to 75% by mass based on the total amount of the aqueous ink jet ink composition.

Resin

The aqueous ink jet ink composition of this embodiment may further contain resin. As the resin, those in which a polymer component is dispersed or dissolved in a solvent in the form of an emulsion are usable, for example. Among the above, those in which a polymer component is dispersed or dissolved in the form of an emulsion are preferable.

Examples of the resin include, but are not particularly limited to, acrylic resin, vinyl acetate resin, vinyl chloride resin, butadiene resin, styrene resin, polyester resin, crosslinking acrylic resin, crosslinking styrene resin, benzoguanamine resin, phenol resin, silicone resin, epoxy resin, urethane resin, paraffin resin, fluororesin, water-soluble resin, and copolymers obtained by combining monomers configuring the resin mentioned above, for example. Examples of the copolymers include, but are not particularly limited to, styrene butadiene resin and styrene-acrylic resin, for example. Among the above, the styrene acrylic resin is preferable.

The content of the resin is preferably 1% by mass or more and 10% by mass or less, more preferably 2% by mass or more and 7.5% by mass or less, and still more preferably 2.5% by mass or more and 5% by mass or less based on the total amount of the aqueous ink jet ink composition.

Surfactant

The aqueous ink jet ink composition of this embodiment may further contain a surfactant. Examples of the surfactant include, but are not particularly limited to, acetylene glycol-based surfactants, fluorine-based surfactants, and silicone-based surfactants, for example.

As the acetylene glycol-based surfactants, one or more selected from alkylene oxide adducts of 2,4,7,9-tetramethyl-5-decyne-4,7-diol and 2,4,7,9-tetramethyl-5-decyne-4,7-diol and alkylene oxide adducts of 2,4-dimethyl-5-decyne-4-ol and 2,4-dimethyl-5-decyne-4-ol are preferable, for example, although not particularly limited thereto. Examples of commercially-available items of the acetylene glycol-based surfactants include, but are not particularly limited to, Olfine 104 series and E series, such as Olfine E1010 (Trade name, manufactured by Air Products Japan, Inc.), Surfynol 465 and Surfynol 61 (Trade name, manufactured by Nissin Chemical Industry CO., Ltd.), and the like, for example. The acetylene glycol-based surfactants may be used alone or in combination of two or more thereof.

Examples of the fluorine-based surfactants include, but are not particularly limited to, perfluoroalkylsulfonate, perfluoroalkylcarboxylate, perfluoroalkylphosphate, a perfluoroalkyl ethylene oxide adduct, perfluoroalkyl betaine, and a perfluoroalkylamine oxide compound, for example. Commercially-available items of the fluorine-based surfactants include, but are not particularly limited to, 5-144 and S-145 (manufactured by Asahi Glass Co., Ltd.); FC-170C, FC-430, and Fluorad FC4430 (manufactured by Sumitomo 3M, Inc.); FSO, FSO-100, FSN, FSN-100, and FS-300 (manufactured by Dupont); FT-250 and 251 (manufactured by Neos Co., Ltd.), and the like, for example. The fluorine-based surfactants may be used alone or in combination of two or more thereof.

Examples of the silicone-based surfactants include a polysiloxane compound, polyether-modified organosiloxane, and the like. Specific examples of commercially-available items of the silicone-based surfactants include, but are not particularly limited to, BYK-306, BYK-307, BYK-333, BYK-341, BYK-345, BYK-346, BYK-347, BYK-348, and BYK-349 (Trade name, all manufactured by BYK Japan KK), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (Trade name, all manufactured by Shin-Etsu Chemical Co., Ltd.), and the like.

The content of the surfactant is preferably 0.1 to 5% by mass and more preferably 0.1 to 3% by mass based on the total mass of the aqueous ink jet ink composition.

Viscosity

The viscosity at 20° C. of the aqueous ink jet ink composition of this embodiment is 3.0 mm$^2$/s or more and 10.0 mm$^2$/s or less, preferably 3.5 mm$^2$/s or more and 7.5 mm$^2$/s or less, and more preferably 3.5 mm$^2$/s or more and 5.0 mm$^2$/s or less. When the aqueous ink jet ink composition is 3.0 mm$^2$/s or more, it becomes difficult for the solvent of the ink composition to volatilize from a nozzle, and thus the intermittent stability is further improved. Moreover, when the viscosity of the aqueous ink jet ink composition is 10.0 mm$^2$/s or less, the amount of ink droplets discharged from a nozzle increases, and therefore the color development properties of the image to be obtained is further improved. The viscosity can be measured by a method described in Examples.

pH

The pH of the aqueous ink jet ink composition of this embodiment is 7 or more, more preferably 7 or more and 11 or less, still more preferably 7.5 or more and 10 or less, and still more preferably 8 or more and 9.5 or less. When the pH is within the ranges mentioned above, there is a tendency that the intermittent printability is further improved. A method for adjusting the pH is not particularly limited and the pH can be adjusted using known pH adjusters and the like.

Ink Jet Recording Apparatus

An ink jet recording apparatus of this embodiment has a serial head or a line head discharging the aqueous ink jet ink composition onto a target recording medium. When the aqueous ink jet ink composition is discharged, a known ink jet recording apparatus can be used. As discharge methods, a piezoelectric system, a system of discharging an ink by bubbles generated by heating an ink, and the like are usable. Among the above, the piezoelectric system is preferable. By the use of the piezoelectric system, scorch or damages to materials by the heat does not occur, and thus an increase in concentration of the pigment and the use of various materials can be achieved.

Herein, the "line head" refers to an ink jet head having a length equal to or larger than the width of the print range. In an ink jet recording system adopting the line head, when a target recording medium passes under a carriage carrying the line head, liquid droplets, such as ink droplets, are applied to all the pixels in which dots are to be formed by one passage. The line head may be configured so as to have a length equal to or larger than the width of the print range with one head, or may be configured so as to have a length larger than the width of the print range by combining a plurality of heads. As the line head for use in giving an ink composition containing a coloring material, two or more of the line heads are also usable for one color. It is difficult for the line head to be subjected to flushing at arbitrary timing as compared with the serial head. Therefore, an aqueous ink jet ink composition for the line head is demanded to have higher intermittent printability. The aqueous ink jet ink composition of this embodiment can be more preferably used as such an ink for the line head.

Target Recording Medium

Recorded matter is obtained by, for example, discharging the ink composition onto a target recording medium using the above-described ink jet recording method. Examples of the target recording medium include an absorbing or non-absorbing target recording medium, for example. The ink jet recording method is widely applicable to target recording media having various absorption capabilities from a non-absorbing target recording medium, into which a water-soluble ink composition is difficult to permeate, to an absorbing target recording medium, into which an ink composition easily permeates. However, when the ink composition is applied to the non-absorbing target recording medium, it is required to provide a drying process and the like in some cases.

Examples of the absorbing target recording medium include, but are not particularly limited to, plain paper, such as electrophotographic paper, and ink jet printing paper (paper for exclusive use for ink jet printing having an ink absorbing layer containing silica particles or alumina particles, or an ink absorbing layer containing a hydrophilic polymer, such as polyvinyl alcohol (PVA) or polyvinyl pyrrolidone (PVP)) having high ink permeability, and art paper, coated paper, cast paper, and the like having relatively low ink permeability for use in general offset printing, for example.

Examples of the non-absorbing target recording medium include, but are not particularly limited to, films or plates of plastics, such as polyvinyl chloride, polyethylene, polypropylene, polyethylene terephthalate (PET), polycarbonate, polystyrene, and polyurethane; plates of metals, such as iron, silver, copper, and aluminum; metal plates manufactured by vapor deposition of these various metals, plastic films, plates of alloys, such as stainless steel or brass; and target recording media in which films of plastics, such as polyvinyl chloride, polyethylene, polypropylene, polyethylene terephthalate (PET), polycarbonate, polystyrene, and polyurethane, are bonded to (coated with) a paper base material, and the like, for example.

FIGURE is a schematic view illustrating a part of an ink jet recording apparatus having a line head. The ink jet recording apparatus illustrated in FIGURE has a paper feed unit (not illustrated) and heads 1 discharging an ink composition, in which a heating unit 2 may be provided on the rear surface side of a target recording medium P to oppose the heads 1. The ink composition is discharged from the heads 1 to a target recording medium P transported from the right side in FIGURE.

The discharge of liquid droplets is performed by, for example, expanding and shrinking pressure generating chambers communicating with nozzle openings. The expanding and shrinking of the pressure generating chambers are performed utilizing the deformation of a piezoelectric vibrator, for example. In such a head, the piezoelectric vibrator is deformed in response to a drive pulse to be supplied, and thus the capacity of the pressure generating chambers varies. Then, the capacity variation causes a pressure fluctuation in a pretreatment liquid and an ink composition in the pressure generating chambers, so that liquid droplets are discharged from the nozzle openings.

EXAMPLES

Hereinafter, the invention is more specifically described with reference to Examples and Comparative Examples. The invention is not limited at all by Examples described below.

Materials for Ink Composition

Main materials for ink compositions used in Examples and Comparative Examples described below are as follows.

Coloring Material

Self-Dispersible Carbon Black Dispersion Liquid 500 g of carbon black bulk powder (Primary particle diameter=18 nm, BET specific surface area=180 $m^2/g$, DBP absorption amount=186 mL/100 g) prepared by a furnace method was added to 3750 g of ion exchanged water, and then the temperature was increased to 50° C. while stirring the same with a dissolver. Thereafter, 5300 g of sodium hypochlorite aqueous solution (Available chlorine concentration=12%) was added dropwise thereto at 50 to 60° C. over 3.5 hours while pulverizing the same by a sand mill using zirconia beads having a diameter of 0.8 mm. Subsequently, the resultant was pulverized by a sand mill for 30 minutes to give a reaction liquid containing self-dispersible carbon black. The reaction liquid was filtered with a 400 mesh wire net, so that the reaction liquid was separated from the zirconia beads and unreacted carbon black. 5% potassium hydroxide aqueous solution was added to the reaction liquid obtained by the separation to adjust the reaction liquid to have a pH of 7.5. Desalination and purification were performed using an ultrafiltration membrane until the electric conductivity of the liquid reached 1.5 mS/cm. The desalination and purification were further performed using an electrodialyser until the electric conductivity of the liquid reached 1.0 mS/cm. The liquid was concentrated until the concentration of the self-dispersible carbon black reached 17% by weight. The concentrate was subjected to a centrifugal separator to remove coarse particles, and then filtered with a 0.6 filter. Ion exchanged water was added to the obtained filtrate, diluted until the concentration of the self-dispersible carbon black reached 15% by weight, and then dispersed to give a self-dispersible carbon black dispersion liquid.

Resin Dispersion Pigment Red 122 Dispersion Liquid

To 15 parts by mass of Pigment Red 122 as a pigment, 30 parts by mass of an ammonium salt of a styrene-acrylic acid copolymer (Weight average molecular weight of 10000, Polymer component of 15%) as a dispersant and 55 parts by mass of ion exchanged water were added and sufficiently mixed, and thereafter the mixture was dispersed in a sand mill (manufactured by Yasukawa Seisakusho) for 2 hours together with glass beads (Diameter: 1.7 mm, Amount: 1.5 times larger than the mixture). After the dispersion, the glass beads were removed to give a resin dispersion Pigment Red 122 dispersion liquid.

Solvent
  Glycerol
  1,2-hexanediol
  2-pyrrolidone
  Triethylene glycol
  Trimethylolpropane
  Oleic acid
  Propylene glycol
PH Adjuster
  Potassium hydroxide
  Triethanol amine
Surfactant
  Olefin E1010 (Acetylene glycol-based surfactant, manufactured by Nisshin Chemical Co., Ltd.)
Preparation of Ink Composition The materials were mixed according to the compositions shown in the following tables 1 and 2, and then sufficiently stirred to give each ink composition. In the following tables 1 and 2, the unit of the numerical value is % by mass and the total is 100.0% by mass. Hereinafter, for convenience, an ink containing the self-dispersible carbon black dispersion liquid is also referred to as a black ink and an ink containing the resin dispersion Pigment Red 122 dispersion liquid is also referred to as a magenta ink.

Method for Calculating Specific Surface Area Measured by Pulsed NMR

A supernatant (blank) obtained by ultracentrifuging the produced black ink using a ultracentrifugal separator (manufactured by Hitachi Koki Co., Ltd., Product Name CS150GXII) and a black ink not subjected to ultracentrifugation were prepared, and then the transverse relaxation time T2 was measured based on the CPMG pulse sequence method using a pulsed NMR device (manufactured by Xigo, Product Name Acron Drop) to calculate the specific surface area of the pigment. The result is shown below.

Self-Dispersible Carbon Black: Specific Surface Area of 25 $m^2/g$

Method for Measuring Viscosity

The viscosity of the ink of each of Examples and each of Comparative Examples was measured at 20° C. with a Cannon-Fenske reverse flow type viscometer using an automatic viscosity meter VMC-252 manufactured by RIGO CO., LTD.

TABLE 1

| | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| Self-dispersible carbon black dispersion liquid (solid content) | 6.0 | 5.5 | 5.5 | 9.0 | 9.0 | | | 6.0 | 6.0 | 6.0 | 6.0 |
| Resin dispersion Pigment Red 122 dispersion liquid (solid content) | | | | | | 6.0 | 6.0 | | | | |
| Glycerol | 12 | 13 | 7.3 | 9 | 1 | 10 | 5 | 6 | 22 | 12 | 12 |
| 1,2-hexanediol | 2 | 2 | 2 | 2 | 2 | 2 | 2 | 2 | 2 | 2 | 2 |
| 2-pyrrolidone | 3 | 3 | 3 | 3 | 3 | 3 | 3 | 3 | 3 | 3 | 3 |
| Triethylene glycol | 3 | 3 | 3 | 3 | 3 | 3 | 3 | 3 | 3 | 3 | 3 |
| Trimethylolpropane | | | | | | | | | | | |
| Oleic acid | | | | | | | | | | | |
| Potassium hydroxide | 0.1 | 0.1 | 0.1 | 0.1 | 0.1 | | | 0.1 | 0.1 | | 0.3 |
| Triethanol amine | | | | | | 1 | 1 | | | | |
| Propylene glycol | 1.0 | 0.5 | 5.5 | 0.8 | 9.0 | 0.5 | 6.0 | 1.0 | 1.0 | 1.0 | 1.0 |
| Olefin E1010 | 1 | 1 | 1 | 1 | 1 | 1 | 1 | 1 | 1 | 1 | 1 |
| Pure water | 71.9 | 71.9 | 72.6 | 72.1 | 71.9 | 73.5 | 73 | 77.9 | 61.9 | 72 | 71.7 |
| Total | 100.0 | 100.0 | 100.0 | 100.0 | 100.0 | 100.0 | 100.0 | 100.0 | 100.0 | 100.0 | 100.0 |
| Ink viscosity at 20° C. ($mm^2/s$) | 4.0 | 4.0 | 4.0 | 4.0 | 4.0 | 4.0 | 4.0 | 3.0 | 10.0 | 4.0 | 4.0 |
| pH | 8.8 | 8.8 | 8.8 | 8.8 | 8.8 | 9.0 | 9.0 | 8.8 | 8.8 | 7.0 | 11.0 |
| Ratio (Propylene glycol/Pigment) | 17 | 9 | 100 | 9 | 100 | 8 | 100 | 17 | 17 | 17 | 17 |
| Color development properties | B | C | C | A | A | A | A | A | C | B | B |
| Intermittent printability | A | A | A | B | B | B | B | B | A | B | B |

TABLE 2

| | Comparative Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Self-dispersible carbon black dispersion liquid (solid content) | 6.0 | 6.0 | 6.0 | 6.0 | 6.0 | 6.0 | 6.0 | 5.0 | 10 | 10 | 6.0 | 6.0 | 6.0 |
| Resin dispersion Pigment Red 122 dispersion liquid (solid content) | | | | | | | | | | | | | |
| Glycerol | 12 | 11 | 6 | 19 | 6 | 6 | 12 | 13 | 12 | 3 | 4 | 25 | 12 |
| 1,2-hexanediol | 2 | 2 | 2 | 2 | 2 | 2 | 2 | 2 | 2 | 2 | 2 | 2 | 2 |
| 2-pyrrolidone | 3 | 3 | 13 | | | | 3 | 3 | 3 | 3 | 3 | 3 | 3 |
| Triethylene glycol | 3 | 3 | 3 | 3 | 11 | | 3 | 3 | 3 | 3 | 3 | 3 | 3 |
| Trimethylolpropane | | | | | | 10 | | | | | | | |
| Oleic acid | | | | | | | | 0.2 | | | | | 0.1 |
| Potassium hydroxide | 0.1 | 0.1 | 0.1 | 0.1 | 0.1 | 0.1 | 0.4 | 0.1 | 0.1 | 0.1 | 0.1 | 0.1 | |
| Triethanol amine | | | | | | | | | | | | | |
| Propylene glycol | 0.4 | 6.1 | 0.1 | 0.1 | 0.1 | 0.1 | 0.1 | 0.5 | 0.8 | 10.1 | 1.0 | 1.0 | 1.0 |

TABLE 2-continued

|  | Comparative Examples | | | | | | | | | | | | |
|---|---|---|---|---|---|---|---|---|---|---|---|---|---|
|  | 1 | 2 | 3 | 4 | 5 | 6 | 7 | 8 | 9 | 10 | 11 | 12 | 13 |
| Olefin E1010 | 1 | 1 | 1 | 1 | 1 | 1 | 1 | 1 | 1 | 1 | 1 | 1 | 1 |
| Pure water | 72.5 | 67.8 | 68.8 | 68.8 | 73.8 | 74.8 | 72.3 | 72.4 | 68.1 | 67.8 | 79.9 | 58.9 | 71.9 |
| Total | 100.0 | 100.0 | 100.0 | 100.0 | 100.0 | 100.0 | 100.0 | 100.0 | 100.0 | 100.0 | 100.0 | 100.0 | 100.0 |
| Ink viscosity at 20° C. (mm$^2$/s) | 4.0 | 4.0 | 4.0 | 4.0 | 4.0 | 4.0 | 4.0 | 4.0 | 4.5 | 4.5 | 2.8 | 10.2 | 4.0 |
| pH | 8.8 | 8.8 | 8.8 | 8.8 | 8.8 | 8.8 | 8.8 | 8.8 | 8.8 | 8.8 | 8.8 | 8.8 | 6.5 |
| Ratio (Propylene glycol/Pigment) | 6.7 | 101.7 | 2 | 2 | 2 | 2 | 2 | 10 | 8 | 101 | 17 | 17 | 17 |
| Color development properties | B | D | B | B | B | B | B | D | A | B | A | D | C |
| Intermittent printability | D | B | D | D | D | D | D | B | D | D | D | B | D |

Color Development Properties

The aqueous ink jet ink composition obtained as described above was charged into an ink jet printer (manufactured by Seiko Epson Corporation, Model Number PX-G930), and then a solid pattern was printed on form paper for full color ink jet printing of "Next-IJ" paper manufactured by Nippon Paper Industries Co., Ltd. The OD value of the obtained solid pattern was measured using a Spectrolino (manufactured by XRite). The color development properties were evaluated based on the OD value measurement results according to the following evaluation criteria.

Black Ink Evaluation Criteria
  A: The maximum OD value is 1.30 or more.
  B: The maximum OD value is 1.25 or more and less than 1.30.
  C: The maximum OD value is 1.20 or more and less than 1.25.
  D: The maximum OD value is less than 1.20.

Magenta Ink Evaluation Criteria
  A: The maximum OD value is 1.2 or more.
  B: The maximum OD value is 1.1 or more and less than 1.2.
  C: The maximum OD value is 1.0 or more and less than 1.2.
  D: The maximum OD value is less than 1.0.

Intermittent Printability

The aqueous ink jet ink composition obtained as described above was charged into an ink jet printer (manufactured by Seiko Epson Corporation, Model Number PX-G930), and then the number of times of discharge free from printing/landing deviation after continuously performing flushing with a fixed number of times of discharge every 0.7 second for 17 minutes was evaluated.

Evaluation Criteria
  A: No landing deviation occurred in flushing with 3 times of discharge.
  B: No landing deviation occurred in flushing with 5 times of discharge.
  C: No landing deviation occurred in flushing with 6 times of discharge.
  D: Landing deviation occurred even in flushing with 6 times of discharge.

The entire disclosure of Japanese Patent Application No. 2017-078823, filed Apr. 12, 2017 is expressly incorporated by reference herein.

What is claimed is:

1. An aqueous ink jet ink composition comprising:
    a pigment;
    a solvent including propylene glycol, glycerol, 1,2-hexanediol, 2-pyrrolidone, and triethylene glycol, wherein a content of the propylene glycol is in the range of 0.5 to 9% by mass; and
    water,
    wherein the aqueous ink jet ink composition has a viscosity of 3.0 mm$^2$/s or more and 10.0 mm$^2$/s or less at 20° C.,
    the aqueous ink jet ink composition has a pH of 7 or more,
    a content of the pigment is 5.5% by mass or more and 9% by mass or less based on a total amount of the aqueous ink jet ink composition,
    a content of the propylene glycol is 8 parts by mass or more and 100 parts by mass or less based on 100 parts by mass of the pigment, and
    a specific surface area of the pigment measured by pulsed NMR is 20 m$^2$/g or more and 55 m$^2$/g or less.

2. The aqueous ink jet ink composition according to claim 1, wherein
    the pigment is carbon black.

3. An ink jet recording apparatus comprising:
    a line head discharging the aqueous ink jet ink composition according to claim 2.

4. The aqueous ink jet ink composition according to claim 1, wherein
    the pigment is a self-dispersible pigment.

5. An ink jet recording apparatus comprising:
    a line head discharging the aqueous ink jet ink composition according to claim 4.

6. An ink jet recording apparatus comprising:
    a line head discharging the aqueous ink jet ink composition according to claim 1.

7. The aqueous ink jet ink composition according to claim 1, further comprising a pH adjuster that is at least one of potassium hydroxide and triethanol amine.

8. An aqueous ink jet ink composition comprising:
    a pigment;
    a solvent including propylene glycol, glycerol, 1,2-hexanediol, 2-pyrrolidone, and triethylene glycol, wherein a content of the propylene glycol is in the range of 0.5 to 9% by mass; and
    water,
    wherein the aqueous ink jet ink composition has a viscosity of 3.0 mm$^2$/s or more and 10.0 mm$^2$/s or less at 20° C.,
    the aqueous ink jet ink composition has a pH of 7 or more,
    a content of the pigment is 5.5% by mass or more and 9% by mass or less based on a total amount of the aqueous ink jet ink composition, and
    a specific surface area of the pigment measured by pulsed NMR is 20 m$^2$/g or more and 55 m$^2$/g or less.

9. The aqueous ink jet ink composition according to claim 8, wherein
    the pigment is carbon black.

10. An ink jet recording apparatus comprising:
a line head discharging the aqueous ink jet ink composition according to claim 9.

11. The aqueous ink jet ink composition according to claim 8, wherein
the pigment is a self-dispersible pigment.

12. An ink jet recording apparatus comprising:
a line head discharging the aqueous ink jet ink composition according to claim 11.

13. An ink jet recording apparatus comprising:
a line head discharging the aqueous ink jet ink composition according to claim 8.

14. The aqueous ink jet ink composition according to claim 8, further comprising a pH adjuster that is at least one of potassium hydroxide and triethanol amine.

\* \* \* \* \*